Dec. 9, 1947.    I. N. REED ET AL    2,432,172
VALVE ACTUATOR
Filed Aug. 25, 1943    3 Sheets-Sheet 1

Isaac N. Reed,
John K. Mayer,    INVENTORS
BY
Victor J. Evans & Co.
ATTORNEYS

Dec. 9, 1947.   I. N. REED ET AL   2,432,172
VALVE ACTUATOR
Filed Aug. 25, 1943   3 Sheets-Sheet 2

INVENTORS
Isaac N. Reed,
John K. Mayer,
BY
Victor J. Evans & Co.
ATTORNEYS

Dec. 9, 1947.   I. N. REED ET AL   2,432,172
VALVE ACTUATOR
Filed Aug. 25, 1943   3 Sheets-Sheet 3

Isaac N. Reed,
John K. Mayer,   INVENTORS
BY
Victor J. Evans & Co.
ATTORNEYS

Patented Dec. 9, 1947

2,432,172

UNITED STATES PATENT OFFICE 2,432,172

VALVE ACTUATOR

Isaac N. Reed, Livingston, Ala., and John K. Mayer, New Orleans, La., assignors to Wedgeplug Valve Company, New Orleans, La., a corporation of Louisiana Application August 25, 1943, Serial No. 499,976

2 Claims. (Cl. 74—22)

The invention relates to a valve and more especially to plug valves of the type disclosed in Letters Patents Nos. 1,894,196 and 2,125,810, issued January 10, 1933, and August 2, 1938, respectively.

The primary object of the invention is the provision of a valve of this character wherein detail refinements in the structural set up are embodied over the said United States Letters Patents Nos. 1,894,196 and 2,125,810, respectively, so that maximum efficiency is had in the working of the valve and also the manufacture of the valve can be carried out with complete accuracy and minimizing expense for so doing, as well as increasing production in less working periods than it would be the case in the manufacture of the valves forming the subject matter of the aforesaid patents.

Another object of the invention is the provision of a valve of this character wherein the valve proper will have a continuous rise and fall upon opening and closing the said valve proper without liability of undue wear on the parts effecting such rise and fall movements and at the same time enabling a simplified machining of the parts thereof.

A further object of the invention is the provision of a valve of this character wherein the plug and its stem for the valve proper are separately connected together, and this connection has a slight play so that proper centering action of the plug valve can be assured for the seating and unseating thereof with accuracy.

A still further object of the invention is the provision of a valve of this character wherein the seating surfaces for the valve proper are raised in order to give clearance between the body for the said plug and such plug whereby a space or clearance is afforded for use in blowing out any accumulations that may collect within the said body and this blowing out can be had by the introduction of steam or inert vapor through suitable plugged ports in the body, these plug ports being also adaptable for the establishment of pressure circulation and thus the plug valve proper can be sealed from the body against line leakage.

A still further object of the invention is the provision of a valve of this character wherein the raised seating surfaces for the valve proper enables only a relatively narrow continuous ring of seating surface around each port to insure pressure tightness when the plug is pressed into its seats by the valve mechanism and also these raised seating surfaces will be protected against corrosion and can furnish a wiping action on the plug to peel off any accumulations which might adhere when turning the said plug from open to closed positions or reversely, the small or minimum seating surfaces for the plug minimizes the grinding or lapping in to a finish and thus being a time saving element for this operation in the production thereof.

A still further object of the invention is the provision of a valve of this character wherein the plug valve proper has a substantially elliptical shaped opening passage therethrough resulting in a maximum area in the port and at the same time maintain strength to the walls of said port particularly when the valve proper is in closed position which is particularly true when the plug is of the smallest dimensions for use in small valves.

A still further object of the invention is the provision of a valve of this character wherein numerous detail features constituting refinements over the said Letters Patents Nos. 1,894,196 and 2,125,810, respectively, assure efficiency in the working of the valve and in the building thereof for service.

A still further object of the invention is the provision of a valve of this character which is comparatively simple in its construction, thoroughly reliable and efficient in operation, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawings.

Similar reference characters indicate corresponding parts throughout the several views in the drawings.

Figure 1:
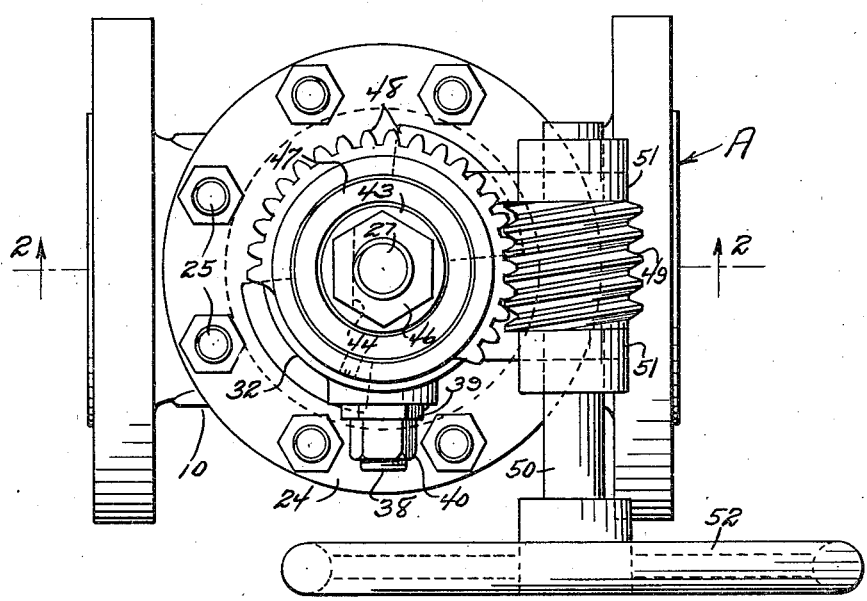
Figure 1 is a top plan view of the valve constructed in accordance with the invention.
Figure 4:
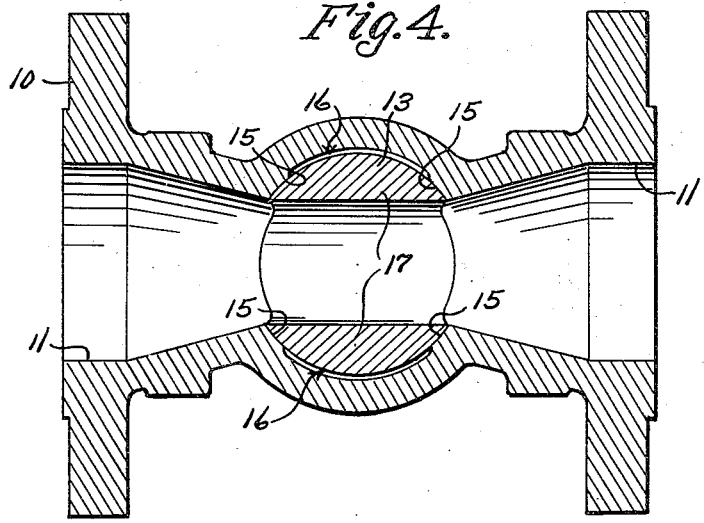
Figure 4 is a sectional view on the line 4—4 of Figure 2, looking in the direction of the arrows.

Referring to the drawings in detail, A designates generally the valve involving the refinements in the construction thereof over the subject matter of United States Letters Patents Nos. 1,894,196 and 2,125,810, respectively, and comprises a body 10 provided with ports 11 and a tapered seat 12 to receive a plug 13 which is the valve element proper. The taper of the valve plug 13 matches the taper of the seat 12 and this plug 13 has an approximately elliptical shape passage 14 to be moved into and out of register with the ports 11 by the rotation of the said plug 13. The seat 12 has provided therein raised seating surfaces 15 which provide clearances 16 between the walls 17 of the plug 13. The body 10 at the seat 12 for the plug 13 and below the latter has formed therewith a basin 18 formed with a center drain opening 19 accommodating a removable plug 20. This basin 18 communicates with the clearances 16. The body 10 also has in opposite sides thereof above the ports 11 perforated bosses 21 closed by removable plugs 22 and these bosses are above the plug valve 13. The purpose of the perforated bosses 21 on removal of the plugs 22 is to enable the flushing of the valve body as is a similar case with respect to the opening 19 on removal of the plug 20.

The body 10 in alignment with the seat 12 for the plug valve 13 is formed with an upstanding cylindrical bonnet receiving extension 23 having fitted thereto a bonnet 24, the latter being removable through the use of nut carrying bolts 25. Centrally of this bonnet is a packing gland 26 through which passes a stem 27 for the plug 13. This stem 27 is formed at its lower end with an enlarged externally threaded coupling head 28 for loose threaded connection in a threaded socket 29 provided in the upper end of the plug 13. The purpose of the loose threaded connection between the plug 13 and the stem 27 is to assure proper seating or centering of the plug 13 in its seat 12. The head 28 has fitted between it and the socket 29 therefor round shear pins 30 to retain the threaded connection of the stem 27 with the plug 13.

Formed with the bonnet 24 and rising therefrom is a yoke 31 provided with an annular head 32 concentric to the stem 27 and fitted in this head is a rotating member 33 which is splined or keyed at 34 to the said stem 27. The rotating member 33 has a cam trackway 35 therein for accommodating diametrically opposed tracking shoes 36, only one being shown and each is formed with a round pin extension 38 snugly fitting a bushing 39 threaded in the head 32. This pin extension 38 carries a nut 40 for the fitting of the pin extension 38 in the bushing. The bushing 39 and the nut 40 are tack welded as at 41 after the assembly and installation. The shoe 36 working in the trackway 35 effects a rise and fall to the stem 37 for the unseating and seating of the plug 13, as will be apparent. The flat face shoe 36 relieves any tendency of the same from digging in the trackway in the rotary member 33 at the open and closed points of the plug 13 when maximum power is applied and thereby offering less wear, easy turning of the rotary member and no tendency to score or dig into the trackway in the working of the valve as would be the case if the shoe were of round contour.

The stem 27 has an upper threaded end 42 and on this end is threaded an adjusting nut 43, the reduced upper portion thereof being diagonally kerfed at 44 so that the said nut when adjusted to the correct position on the threaded end of the stem 42 will thread lock at that position. The top of the adjusting nut 43 is given a slight bevel as shown at 45 for a jambing action through the association of a lock nut 46 carried by the threaded end 42 of the stem 27. When the lock nut 45 is jambed against the upper part of the adjusting nut it prevents any possibility of movement of either the adjusting nut or the lock nut in the stem, the kerf 44 in the adjusting nut is effective to act as a spring washer to prevent the lock-nut 46 from loosening.

The rotary member 33 is socketed for accommodating the adjusting nut 43 and also has threaded therein a retaining ring 47 for the coupling of the adjusting nut 43 and the rotary member together with a sliding fit.

The rotary member 33 above the head 32 is formed with external gear teeth 48 for meshing with a worm gear 49 fixed to a power shaft 50 journaled in bearings 51 and such power shaft 50 is fitted with a hand wheel 52 for manual turning of the said shaft.

Figures 2, 5, 7:
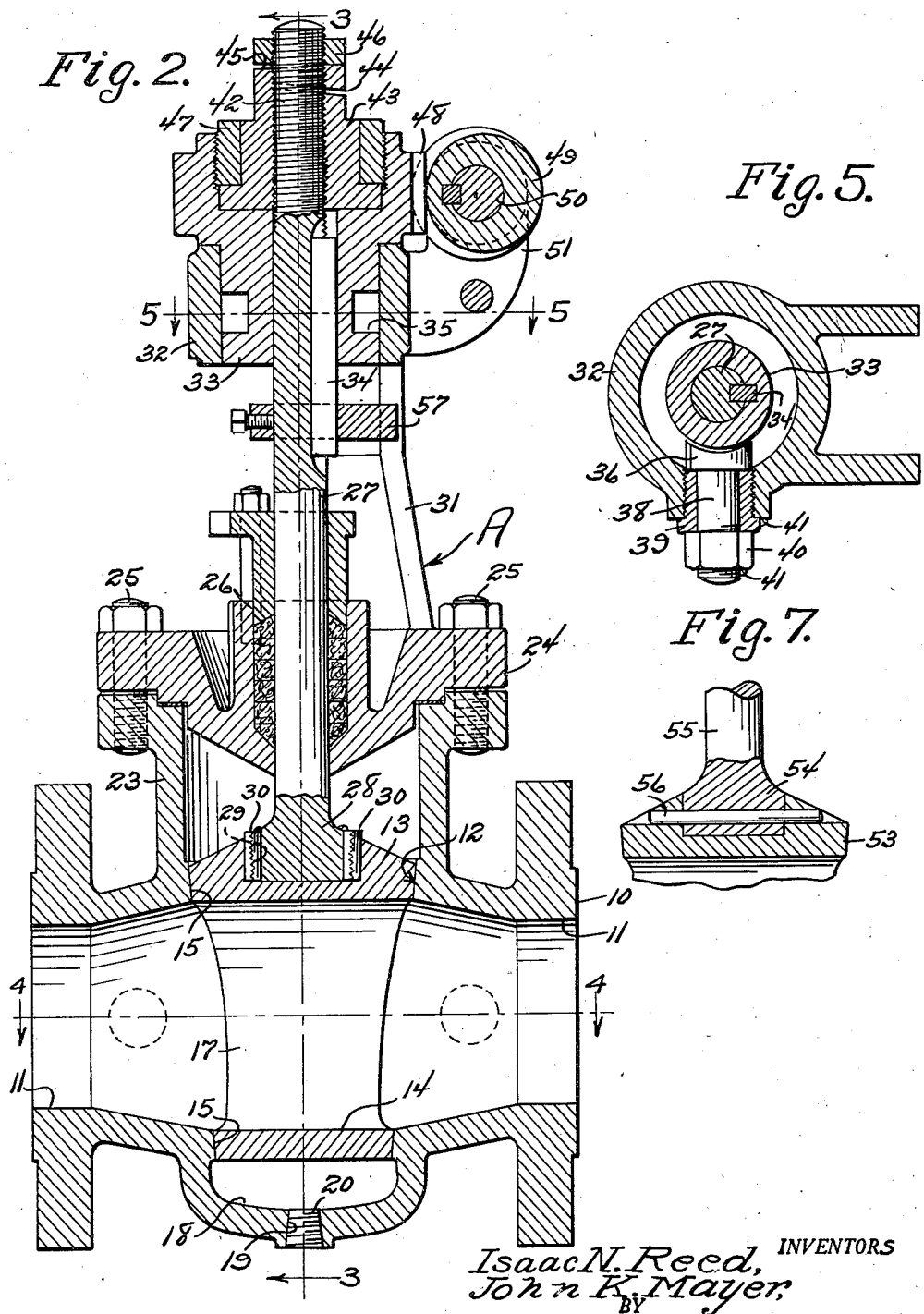
Figure 2 is a sectional view taken on the line 2—2 of Figure 1, looking in the direction of the arrows.
Figure 5 is a detail sectional view on the line 5—5 of Figure 2, looking in the direction of the arrows.
Figure 7 is a fragmentary side elevation partly in section showing a modified form of fastening of the stem of the valve to the plug proper.
Figure 3:
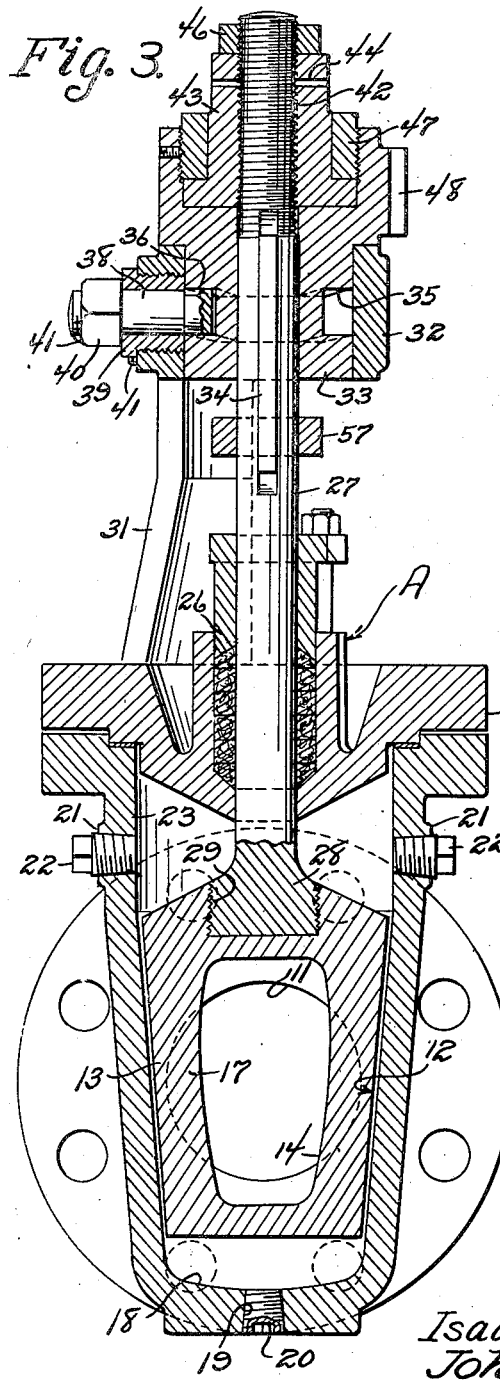
Figure 3 is a sectional view taken on the line 3—3 of Figure 2, looking in the direction of the arrows.
Figure 6:
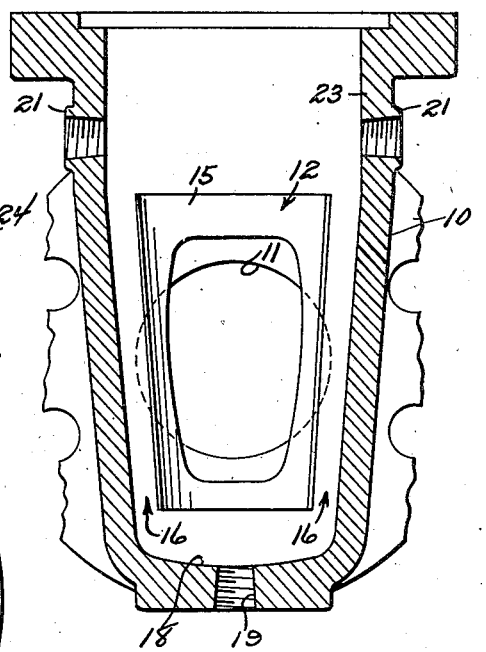
Figure 6 is an enlarged vertical transverse sectional view through the body of the valve showing in detail the centering of the plug in the face therefor within the body.

In Figure 7 of the drawings there is shown a slight modification wherein the plug 53 has the lower headed end 54 of the stem 55 loosely coupled thereto by a cross pin 56 fitting said plug and stem head as shown.

Splined or keyed to the stem 27 is an indicator arm 57 to coact with the yoke 31 for limiting the rotation of the valve plug 14 in either direction and at the same time giving visible indication of the position of the said plug 14 within the body 10 of the valve.

The adjusting nut 43 in association with the lock nut 46 permits of the adjustment of the stem 27 in the rotary member 33 as will be apparent. The trackway 35 in the rotary member 33 by reason of its formation enables a continuous rise and fall to the stem 27 for the easy and quick opening and closing of the valve plug 13, and the shoes 36 by reason of their formation prevent any digging in of this trackway or excessive wear therebetween, it being apparent that, in addition to turning, the plug 13 has an upward and downward movement both in the opening and closing of the valve and thus a positive seating of the plug 13 will be assured thereby.

The plug 13 and the stem 27 by reason of the loose connection therebetween and being made in two pieces assures play so that some slight centering action can be obtained when the plug has been forced down into the seats in the valve body for assuring proper seating of the said plug. It is of course understood that in lieu of the use of two or more shoes 36 a single shoe can be employed, this being so when constructing small valves.

The raising of the seating surfaces 15 in the body 10 for the plug 13 as has heretofore been stated establishes clearances 16 between such plug and the body so as to permit the blowing out of any accumulations that might collect within the valve and this is effected by introducing steam or inert vapor through the apertures 21 on removal of the plugs 22 and opening the aperture 19 by removal of the plug 20. Also through these apertures 21 pressure circulation could be established and held by vapor, liquid or grease, and thus the plug could be sealed from the body against line leakage. These raised seating surfaces enables true grinding thereof and also to relieve accumulation of corrosion or erosion which might adhere to the plug surface in the use of the valve. The basin 18 can be drained through the opening 19 therein on removal of the plug 20. Other advantages by reason of the detail construction of the valve will be had both in the production and the operation of said valve.

What is claimed is:

1. In a valve of the plug type having a stem extending into a bonnet thereon, a gear keyed on the stem rotatably mounted in the bonnet having a centrally disposed recess in the upper surface and a hub integral therewith and extending therefrom, said hub having a circumferential arcuate cam groove in the peripheral surface, shoes adjustably mounted in the bonnet extending into the groove in the hub coacting therewith to actuate the valve stem axially, and a worm gear rotatably mounted in the bonnet meshing with said gear and having an actuating handwheel.

2. In a valve of the plug type having a stem extending into a bonnet thereon, a gear keyed on the stem rotatably mounted in the bonnet having a centrally disposed recess in the upper surface and a downwardly extending hub integral therewith and having a circumferential arcuate cam groove in the peripheral surface, elongated shoes with flat working faces and extending threaded studs positioned in said groove, threaded bushings in which the studs of the shoes are mounted in the bonnet, an adjusting nut threaded on the stem positioned in the recess of the gear, and a worm gear rotatably mounted in the bonnet meshing with said gear and having an actuating handwheel.

ISAAC N. REED.
JOHN K. MAYER.

REFERENCES CITED

The following references are of record in the file of this patent:

UNITED STATES PATENTS

| Number | Name | Date |
| --- | --- | --- |
| 1,921,846 | Sparks | Aug. 8, 1933 |
| 2,315,058 | Holt | Mar. 30, 1943 |
| 2,314,759 | Bischoff | Mar. 23, 1943 |
| 2,327,425 | Hilker | Aug. 24, 1943 |
| 1,894,196 | Reed | Jan. 10, 1933 |
| 2,125,810 | Reed | Aug 2, 1938 |